United States Patent
Potter et al.

(10) Patent No.: US 6,322,436 B2
(45) Date of Patent: Nov. 27, 2001

(54) METHOD AND SYSTEM FOR PROCESSING WASTE PRODUCTS GENERATED IN AN ANIMAL DEHAIRING OPERATION

(75) Inventors: Wesley W. Potter, Greeley, CO (US); R. Paul Clayton, Wilder, ID (US)

(73) Assignee: Monfort, Inc, Greeley, CO (US)

( * ) Notice: Subject to any disclaimer, the term of this patent is extended or adjusted under 35 U.S.C. 154(b) by 0 days.

(21) Appl. No.: 09/769,548

(22) Filed: Jan. 24, 2001

Related U.S. Application Data

(63) Continuation of application No. 09/630,450, filed on Aug. 2, 2000, now Pat. No. 6,220,951, which is a continuation of application No. 09/256,246, filed on Feb. 23, 1999, now Pat. No. 6,129,623.

(60) Provisional application No. 60/075,493, filed on Feb. 23, 1998.

(51) Int. Cl.[7] .............................. A22C 21/04; A22C 25/02
(52) U.S. Cl. .................................. 452/71; 452/74; 452/76
(58) Field of Search .................................. 452/71, 74, 76, 452/77, 81

(56) References Cited

U.S. PATENT DOCUMENTS

| | | | |
|---|---|---|---|
| 1,254,248 | 1/1918 | Lowry | 452/71 |
| 1,622,720 | 3/1927 | Hofmeister | 435/7.1 |

(List continued on next page.)

FOREIGN PATENT DOCUMENTS

| | | | | |
|---|---|---|---|---|
| 152670-A | * | 8/1953 | (AU) | 452/123 |
| 362209014A | | 9/1987 | (JP) | . |
| 405311105A | | 11/1993 | (JP) | . |
| 407115902A | | 5/1994 | (JP) | . |
| 06315906 | | 11/1994 | (JP) | . |
| 407330556A | | 12/1995 | (JP) | . |
| 408151397A | | 6/1996 | (JP) | . |
| 09116374 | | 4/1997 | (JP) | . |
| 410291999A | | 11/1998 | (JP) | . |

OTHER PUBLICATIONS

"Trade Practices for Proper Packer Cattlehide Delivery" Leather Industries of America, Inc., Apr., 1990, pp. 1–27.

Heidemann et al., "Eine neue Konzeption der Rohhautaufbereitung", Das Lader, 1977, vol. 28, pp. 138–149.

Heidemann et al., Fachzeitschrift fur doe Chemle und Technologie der Lederherstellung Mitteilungsblatt des Vereins fur Gerberel–Chemie und–Tecknik E.V., Das Leder, 1997, vol. 28, pp. 81–89.

(List continued on next page.)

*Primary Examiner*—Willis Little
(74) *Attorney, Agent, or Firm*—Sheridan Ross P.C.

(57) ABSTRACT

Disclosed is a novel method and system for dehairing an animal, providing a system for recycling and safely disposing of chemical and biological wastes produced during such dehairing method. Included in such method are processes for handling sodium production in waste materials, reducing and handling production of $H_2S$, removing sulfides from animal hides, safely disposing of sulfide waste, removing solids from the waste materials, and reducing water and reagent use and disposal.

9 Claims, 15 Drawing Sheets

U.S. PATENT DOCUMENTS

| | | | |
|---|---|---|---|
| 2,249,757 | | 7/1941 | Fleyy ..................................... 435/7.1 |
| 2,289,004 | | 7/1942 | Franz ..................................... 435/7.1 |
| 2,595,638 | * | 5/1952 | Castelow ............................... 452/123 |
| 3,116,515 | | 1/1964 | Wilcox ................................... 452/71 |
| 3,676,153 | | 7/1972 | Sheldon ................................. 452/71 |
| 3,797,068 | | 3/1974 | Dillon .................................... 452/76 |
| 3,808,637 | | 5/1974 | Lapidus ................................. 452/71 |
| 3,843,997 | | 10/1974 | Treharne et al. ....................... 452/71 |
| 3,915,889 | | 10/1975 | Jurd ...................................... 252/404 |
| 4,063,331 | * | 12/1977 | O'Neal et al. ......................... 452/123 |
| 4,121,904 | | 10/1978 | Schamper ................................ 8/161 |
| 4,151,306 | | 4/1979 | Williams et al. ...................... 424/456 |
| 4,309,795 | | 1/1982 | Simonsen ................................ 452/94 |
| 4,478,728 | | 10/1984 | Hopkins et al. ....................... 8/94.18 |
| 4,512,058 | | 4/1985 | Abele ..................................... 452/73 |
| 4,548,608 | | 10/1985 | Swanson et al. ..................... 8/94.16 |
| 4,581,148 | | 4/1986 | Swanson et al. ..................... 8/94.18 |
| 4,618,344 | | 10/1986 | Wells ...................................... 8/161 |
| 4,664,836 | | 5/1987 | Taylor, Jr. et al. .................... 252/91 |
| 4,674,152 | | 6/1987 | Georges ................................. 452/73 |
| 4,731,908 | | 3/1988 | Thorsen . | 
| 4,852,216 | | 8/1989 | Clayton et al. ........................ 452/81 |
| 4,862,557 | | 9/1989 | Clayton et al. ........................ 452/81 |
| 5,093,140 | | 3/1992 | Watanabe ............................... 452/74 |
| 5,098,584 | | 3/1992 | Leen ...................................... 210/768 |
| 5,101,841 | | 4/1992 | Crews et al. ......................... 132/203 |
| 5,149,295 | | 9/1992 | Bowling et al. ....................... 452/71 |
| 5,276,138 | | 1/1994 | Yamada et al. ....................... 530/357 |
| 5,324,642 | | 6/1994 | Baumgartner ........................ 435/7.1 |
| 5,376,042 | | 12/1994 | Reber et al. ........................... 452/71 |
| 5,466,579 | | 11/1995 | Baumgartner ........................ 435/7.1 |
| 5,639,451 | | 6/1997 | Evans, Jr. et al. ................ 424/70.51 |
| 5,690,956 | | 11/1997 | Lau ....................................... 424/450 |
| 5,763,583 | | 6/1998 | Arai et al. ............................ 530/353 |
| 5,804,172 | | 9/1998 | Ault .................................... 424/70.1 |
| 5,817,155 | | 10/1998 | Yasuda et al. ......................... 452/71 |
| 6,129,623 | | 10/2000 | Potter et al. ........................... 452/71 |

OTHER PUBLICATIONS

O'Brien et al. "Continuous Automatic Beamhouse Processing III. Effects of Processing Conditions of the Rapid Soaking and Unhairing of Cattlehides", JALCA, 1984, vol. 79, pp.370–380.

Cranston et al., "Further Report on the New Csiro Unhairing Process", CSIRO Division of Protein Chemistry, Parkville 3052, pp. 1–11.

Sagala et al. "RioBenherstellung und Konservierung im Darmstadter Kurzeitverfahren und Weiteverarbeitung der so hergestellten Blossen", Das Leder, 1977, vol. 28, pp. 166–169.

Komanowsky et al. "Continuous Automatic Beamhouse Processing II. Adaption of Chemical Operations to the Requirements of the Process", JALCA, 1983, vol. 78, pp.300–315.

Schnell et al. "Effects of Postexsanguination Dehairing on the Microbial Load and Visual Cleanliness of Beef Carcasses", J. of Food Protection, vol. 58, No. 12, pp. 1297–1302.

Sofos et al. "Nonacid Meat Decontamination Technologies: Model Studies and Commercial Applications", Intl. J. of Food Microbiology, 44, 1998, pp. 171–188.

* cited by examiner

METHOD AND SYSTEM FOR PROCESSING WASTE PRODUCTS GENERATED IN AN ANIMAL DEHAIRING OPERATION

RELATED APPLICATIONS

This is a Continuation application of pending prior application Ser. No. 09/630,450 filed Aug. 2, 2000, now U.S. Pat. No. 6,220,951 which is a continuation of Ser. No. 09/256,246 filed Feb. 23, 1999, not U.S. Pat. No. 6,129,623 which claims priority from U.S. Provisional Patent Application No. 60/075,493 filed Feb. 23, 1998. The entire disclosure of the provisional and parent applications are considered to be part of the disclosure of the accompanying application and are hereby incorporated by reference.

FIELD OF THE INVENTION

The present invention relates to a method and system for the removal of hair from animals prior to slaughtering of such animal, and to reuse, recycling and disposal systems for compositions generated in such a dehairing method.

BACKGROUND OF THE INVENTION

In the meat industry, and particularly in those areas devoted to the processing of beef and pork, meat packers slaughter animals in a process in which the animals are stunned, bled, skinned, eviscerated, and fabricated into meat sections which are marketable to the public or the restaurant trade. Animals enter a meat slaughter plant with various foreign materials present on their hair, including blood, dirt, manure, mud and vegetative material. An animal's hair is also contaminated with a multitude of microorganisms, some of which are pathogenic to humans. Most bacteria present in a meat slaughter and processing facility are carried into the facility on the hides of animals to be slaughtered. During the slaughtering process, these microorganisms contact meat and other meat by-products, thereby contaminating such products, creating handling problems and reducing the shelf life and safety of meat products.

The control of contamination by microorganisms is a recognized problem in the meat packing industry. Many techniques have been employed in the past in an effort to destroy surface bacterial flora on meat. For example, U.S. Pat. No. 4,852,216 to Clayton discloses a disinfection system using acetic acid spray in order to reduce bacteria levels and thereby increase shelf life of meat products. Other inventors have utilized anti-microbial agents for preserving products normally subject to microbial spoilage. For example, U.S. Pat. No. 3,915,889 to Jurd discloses a certain anti-microbial agent that can be applied for preservation of a wide variety of substances including meat by-products.

Still other inventors have recognized the advantages of dehairing animals to facilitate the slaughtering process. U.S. Pat. No. 4,674,152 to Georges discloses an apparatus and method for slaughtering animals by bleeding an animal, electrostatically charging the animal's hair, applying a combustible fluid to the hair and subsequently igniting the combustible fluid to burn the hair from the animal's body. U.S. Pat. No. 4,309,795 to Simonsen discloses a method and apparatus for dehairing hogs wherein the hog is bled, its skin is scalded with hot water and then subjected to abrasive treatment to remove the hog's hair. U.S. Pat. No. 5,149,295 to Bowling et al., which is incorporated herein by reference in its entirety, discloses the use of a depilatory substance to remove animal hair, such depilatory substance including a chemical that is able to cleave disulfide bonds between cysteine amino acid residues present in animal hair.

Methods for dehairing which use chemicals to remove animal hair, however, generate chemical and animal byproducts which can be. toxic and/or environmentally hazardous and can pose significant problems for waste disposal. Therefore, a need exists for a method for dehairing animals which includes protocols for recycling and/or safely disposing of compositions and waste products produced during the process. The present invention addresses such a need by providing a process for reducing bacterial contamination of meat and meat by-products from the outset of the slaughtering process, prior to the exsanguination of the animal, while minimizing the cost and environmental impact of such a process through a novel recycle, reuse and disposal system.

SUMMARY OF THE INVENTION

The present invention is directed to a method and system for dehairing animals which includes processes for recycling, reusing and safely disposing of chemical and biological waste products from such a dehairing process. More particularly, the present invention is generally directed to a process for dehairing an animal, which includes the steps of immobilizing the animal, prewetting the hide, applying a depilatory substance to the hide, removing the hair from the hide, and dispatching the animal. In certain embodiments, the present method also includes the steps of neutralizing the hide and washing the hide with fresh water. Included in each step of this method are collection, recycling and waste disposal processes for treating individual or combined waste streams from the prewetting, depilatory application, hair removal, neutralizing (if necessary) and fresh water rinse (if necessary) steps. As used herein, "liquid and/or solid wastes" are meant to include liquid and/or solid constituents since such liquids and/or solids may be recyclable and thus may not be technically deemed to be "wastes".

Such processes for waste stream treatment can include the steps of: (a) separation of solid waste from liquid waste; (b) further separation, recycling and disposal of solid wastes; and (c) treatment and recycling of liquid wastes. Step (b) of further separation, recycling and disposal of solid wastes can include separation of hair from other solids such as mud and manure, followed by recovery of valuable proteins from the hair and recycling/disposal of mud and manure to land applications or landfills. Step (c) of treatment of the liquid waste can include any or all of the steps of (a) removing fine solid waste from the liquid; (b) recovering and recycling water from the liquid waste; (c) recovering and recycling sulfides from the liquid waste; (d) controlling, removing and/or recycling of $H_2S$ gas from the liquid waste; and (e) recycle and/or disposal of. residual sulfides in the liquid waste as sulfates.

BRIEF DESCRIPTION OF THE DRAWINGS OF THE INVENTION

DETAILED DESCRIPTION OF THE INVENTION

Figure 1A:
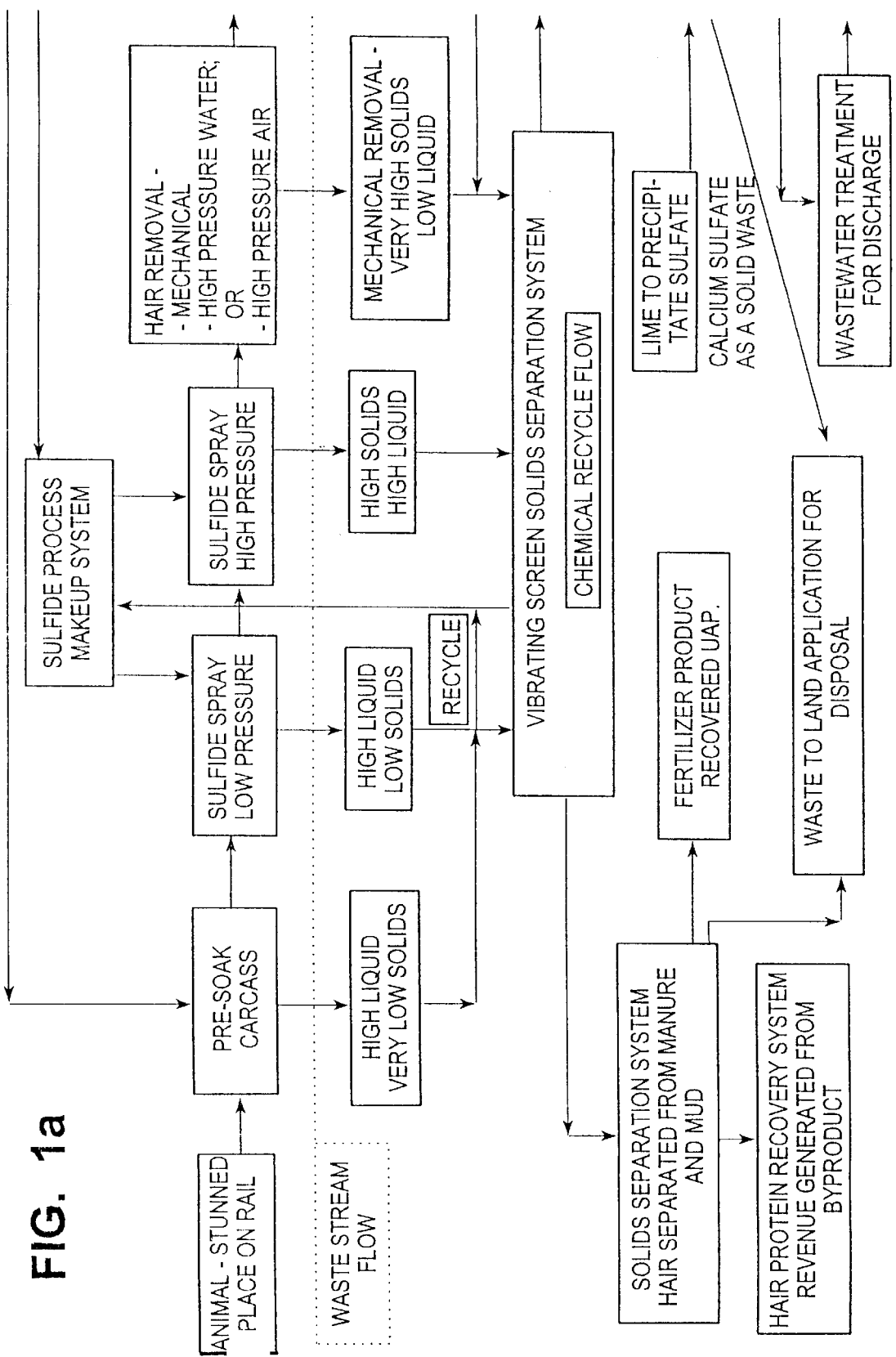
FIG. 1 is a flow chart which schematically illustrates a dehairing process according to the present invention.
Figure 1B:
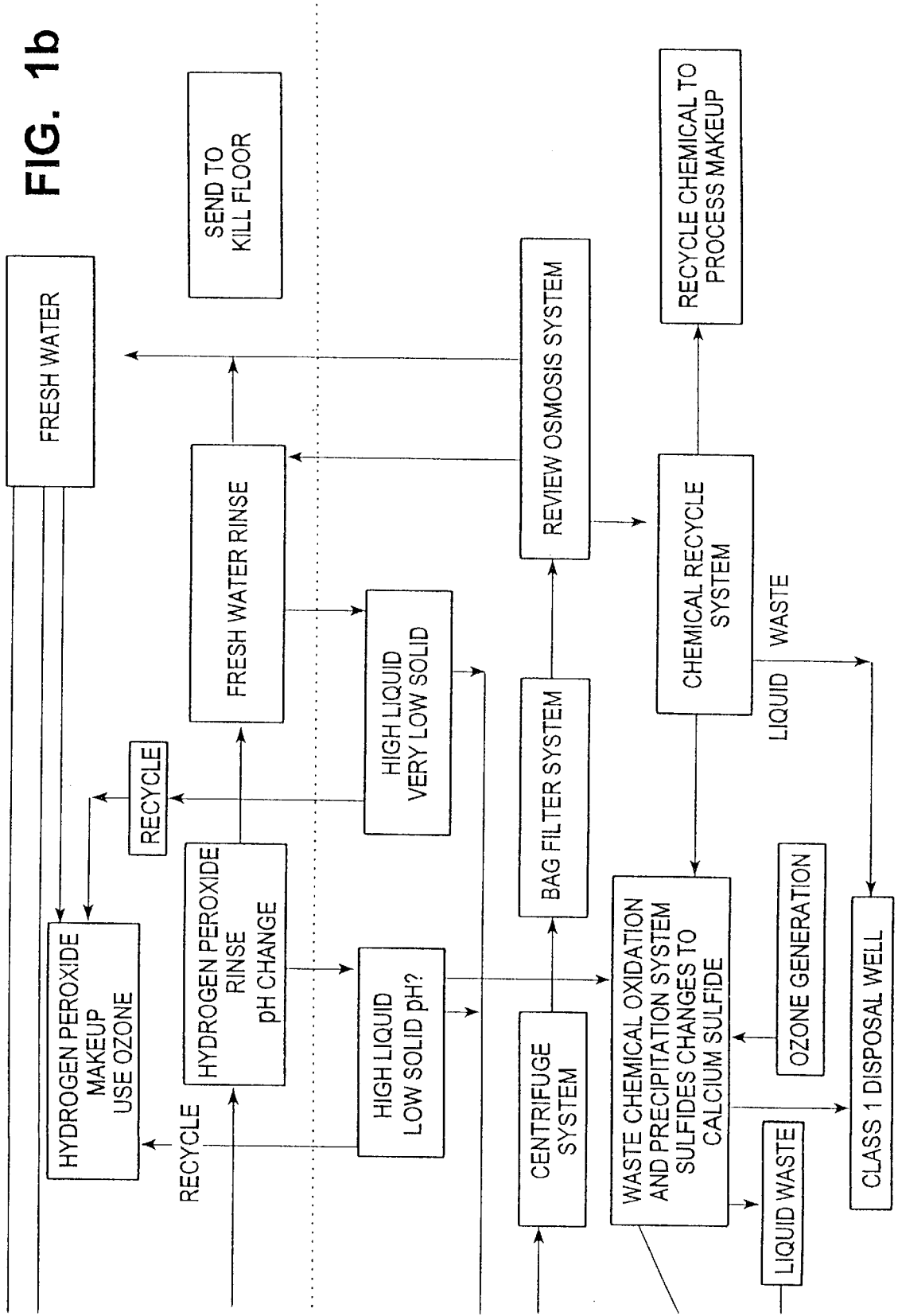
Figure 2A:
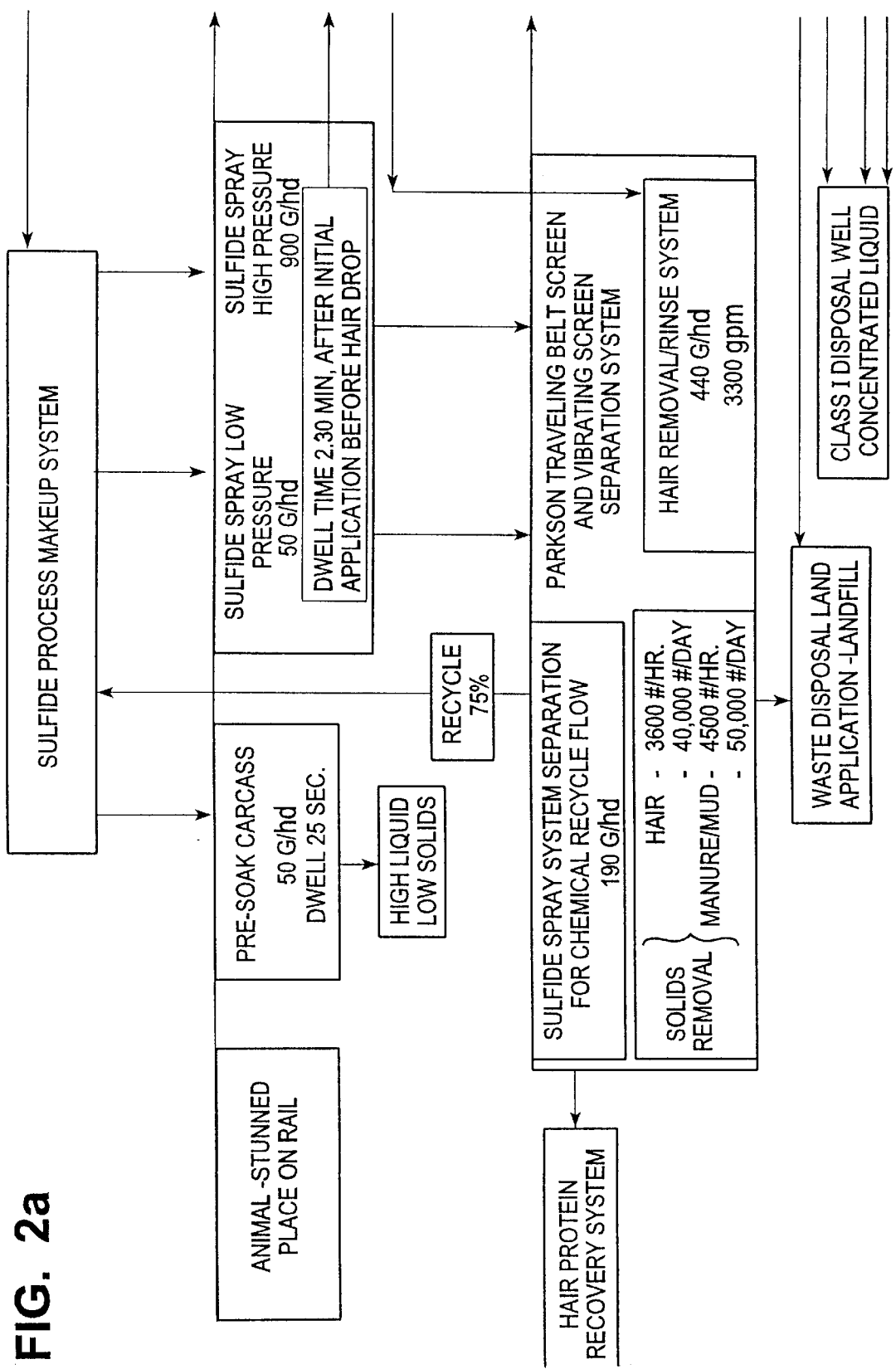
FIG. 2 is a flow chart which schematically illustrates a dehairing process according to the present invention.
Figure 2B:
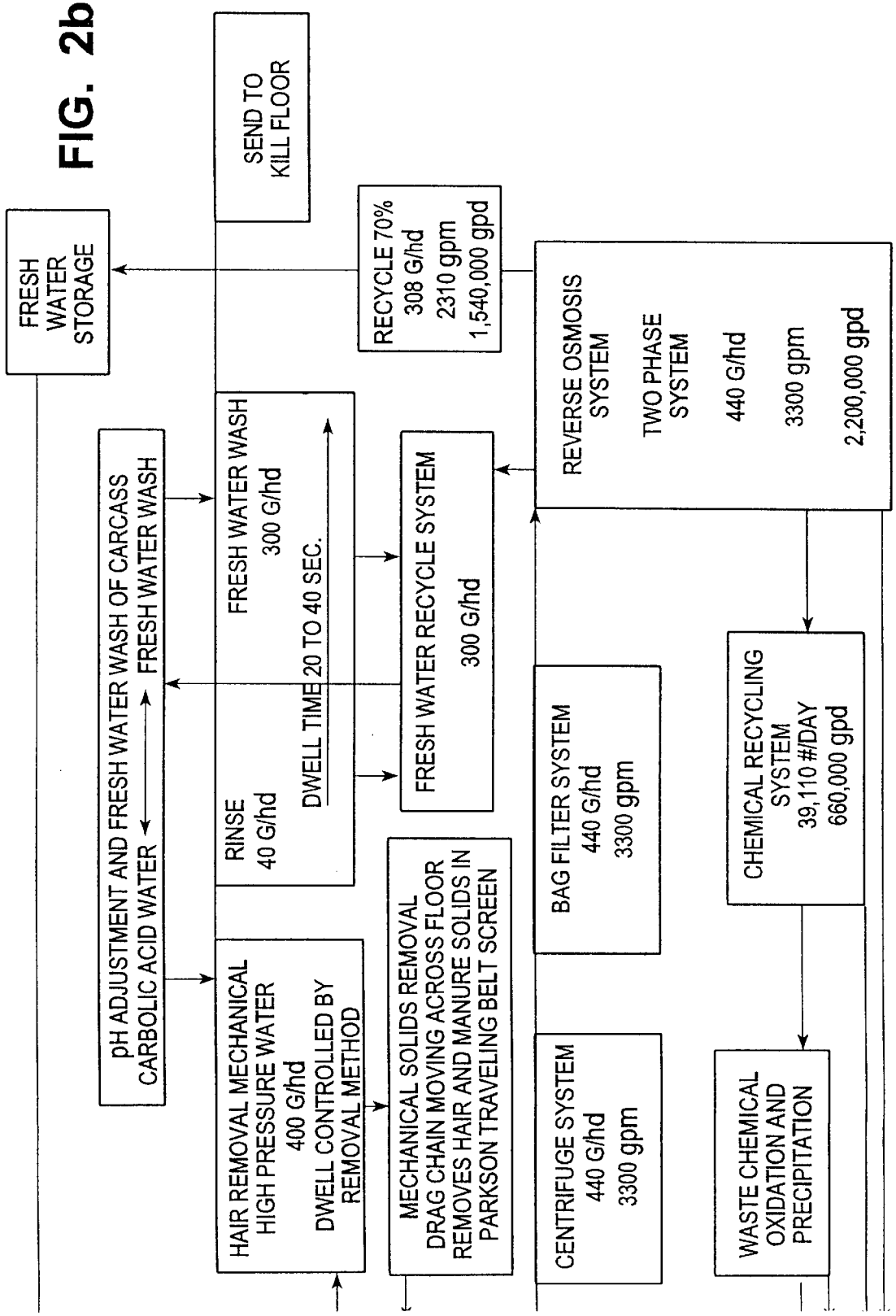
Figure 3A:
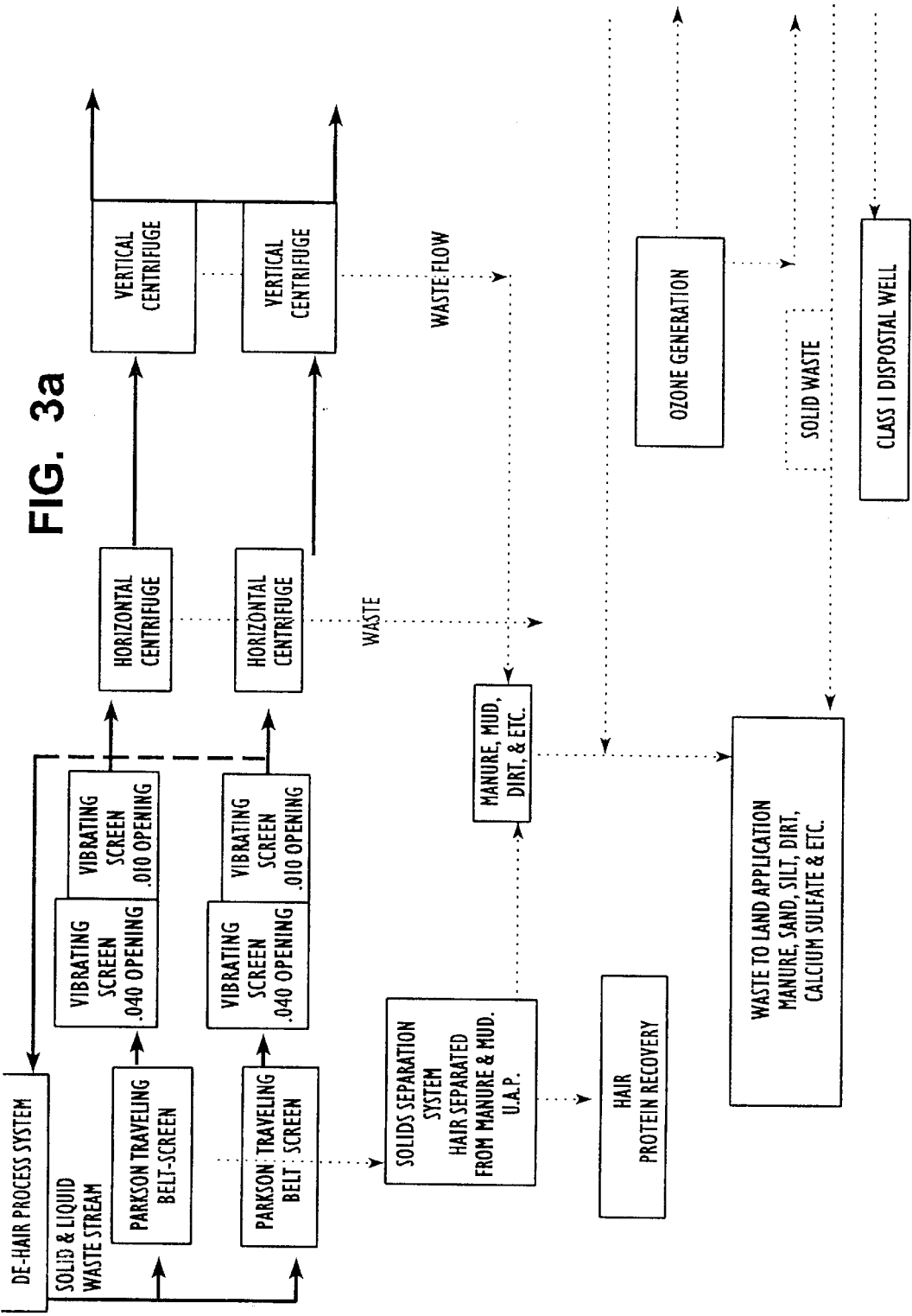
FIG. 3 is a flow chart which schematically illustrates a dehairing process according to the present invention.
Figure 3B:
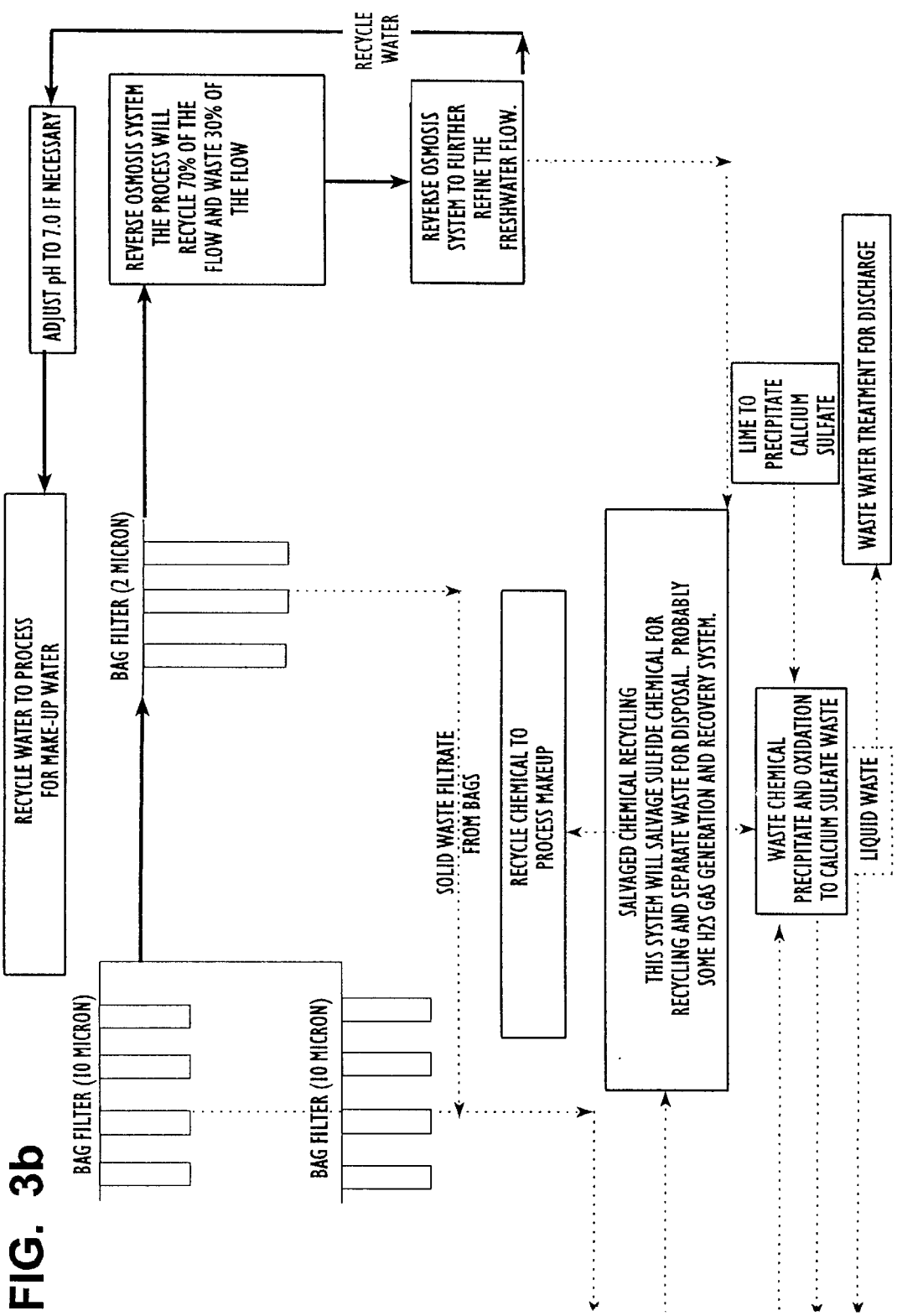
Figure 4A:
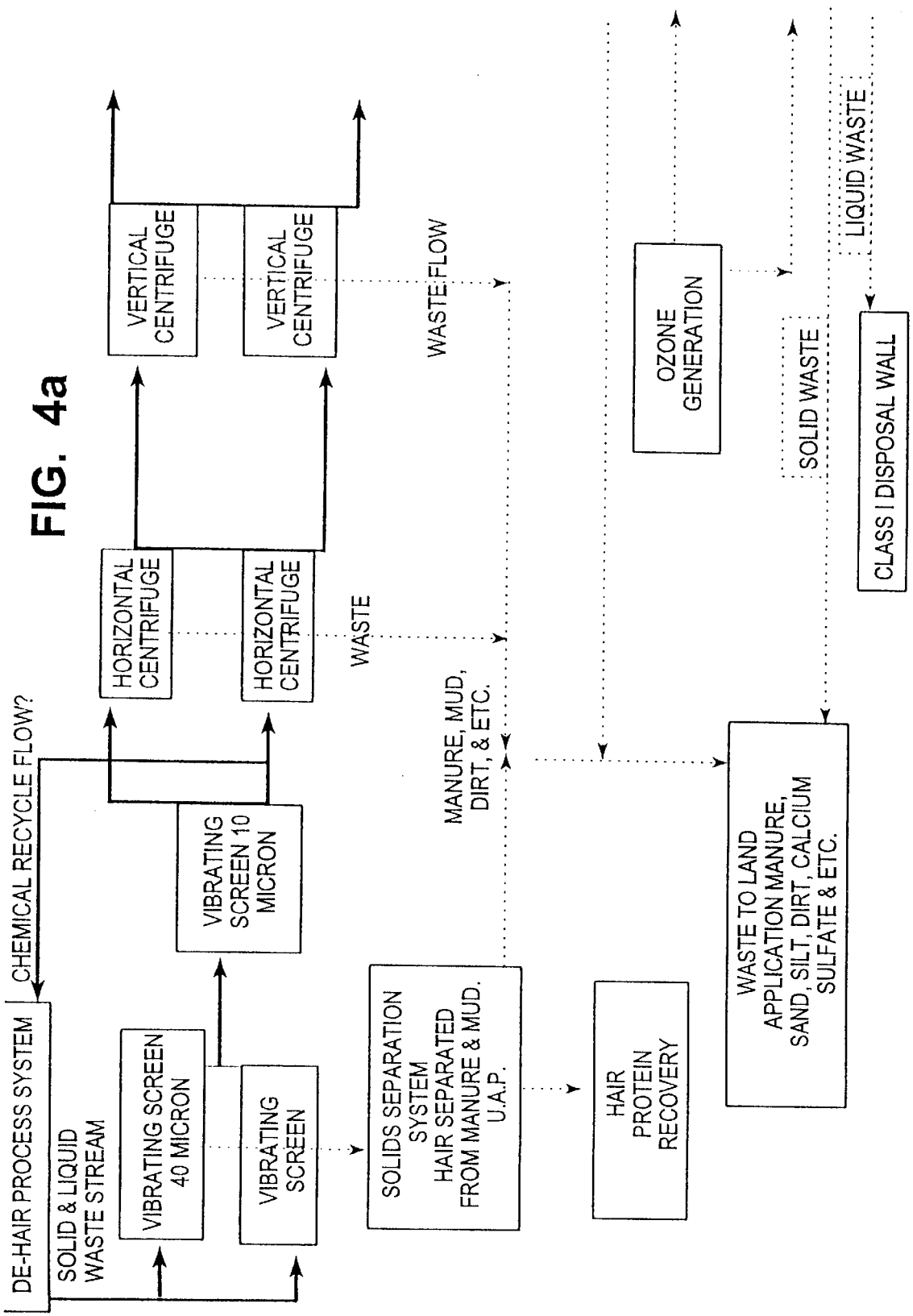
FIG. 4 is a flow chart which schematically illustrates a dehairing process according to the present invention.
Figure 4B:
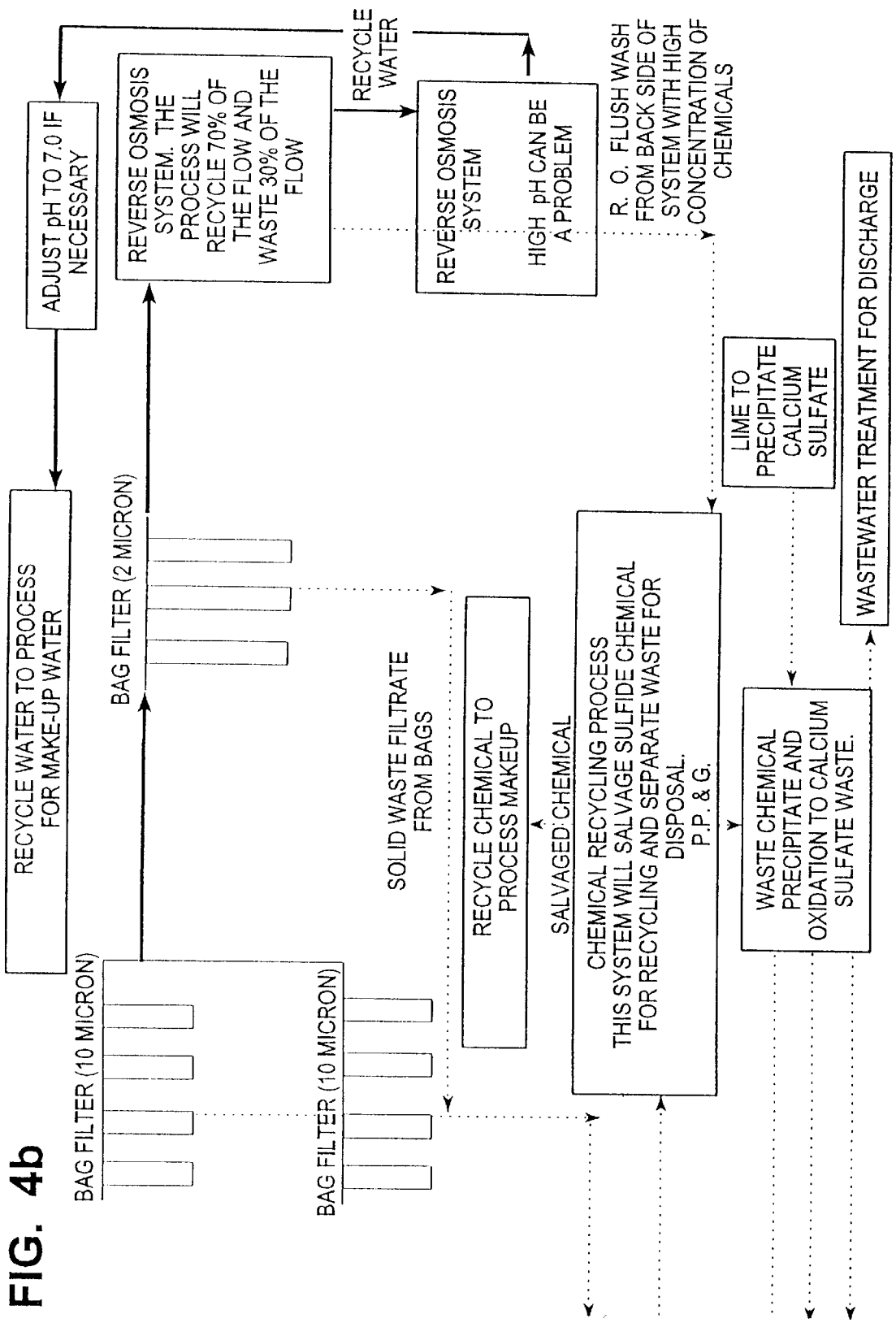
Figure 5A:
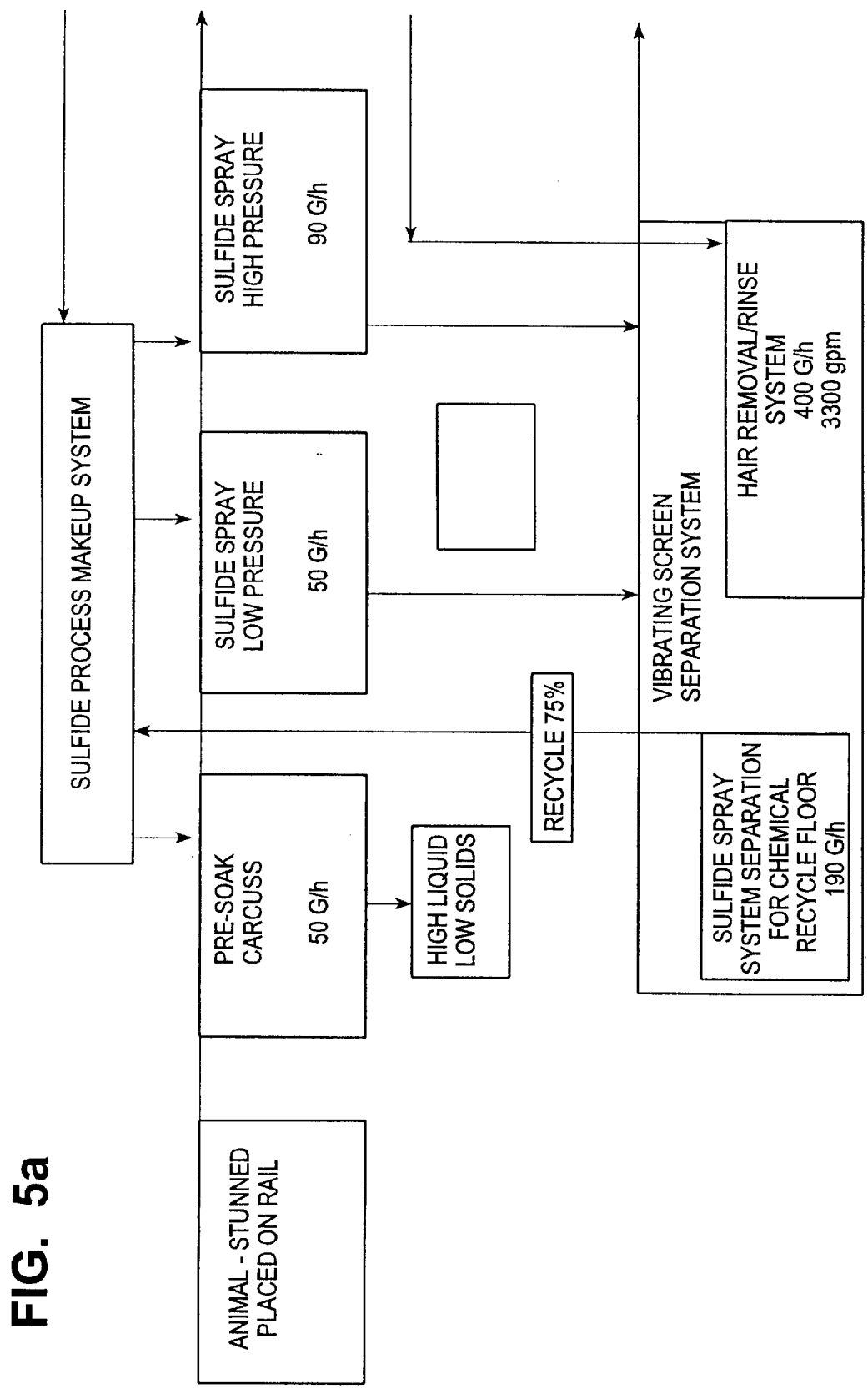
FIG. 5 is a flow chart which schematically illustrates a dehairing process according to the present invention.
Figure 5B:
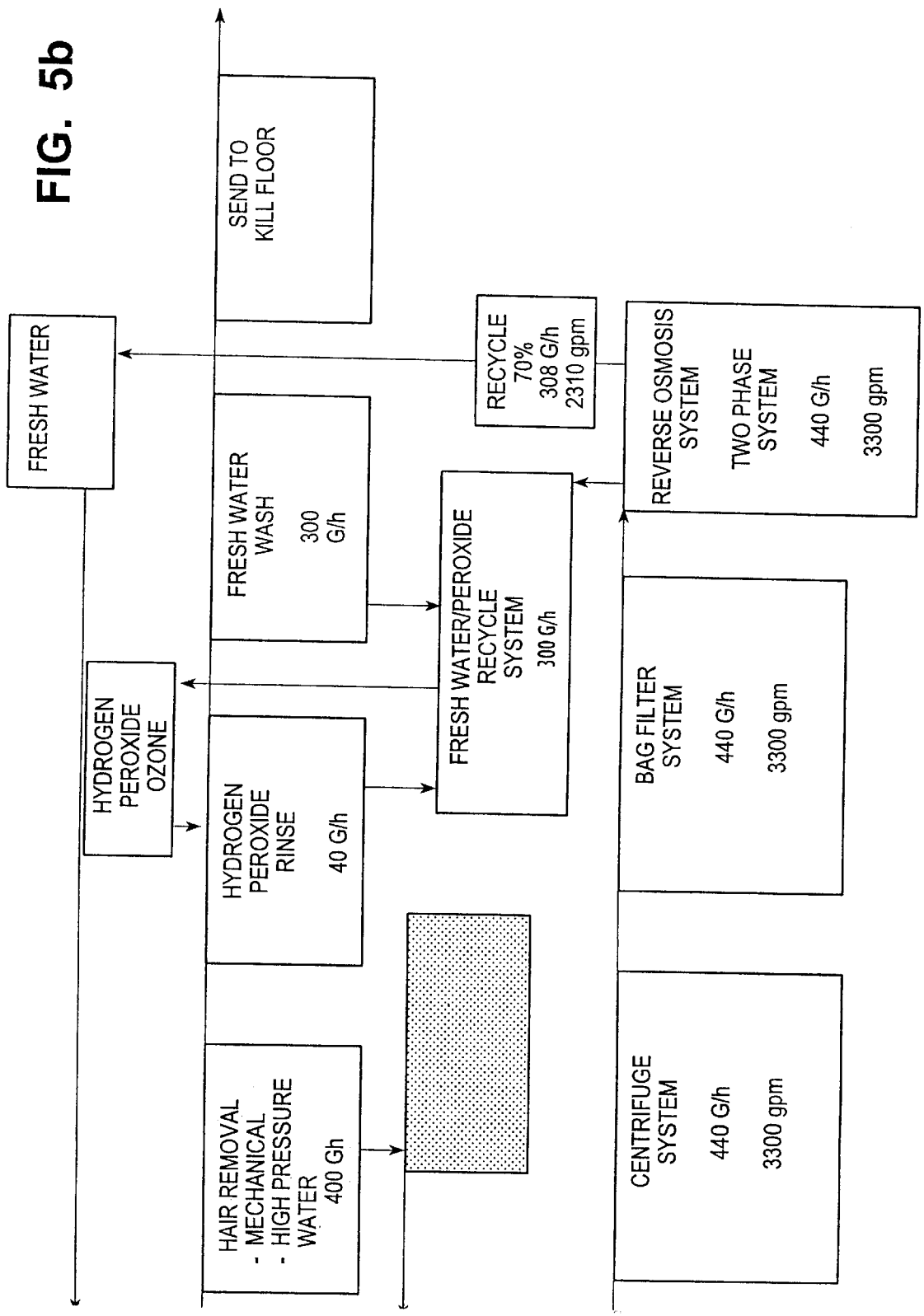
Figure 6:
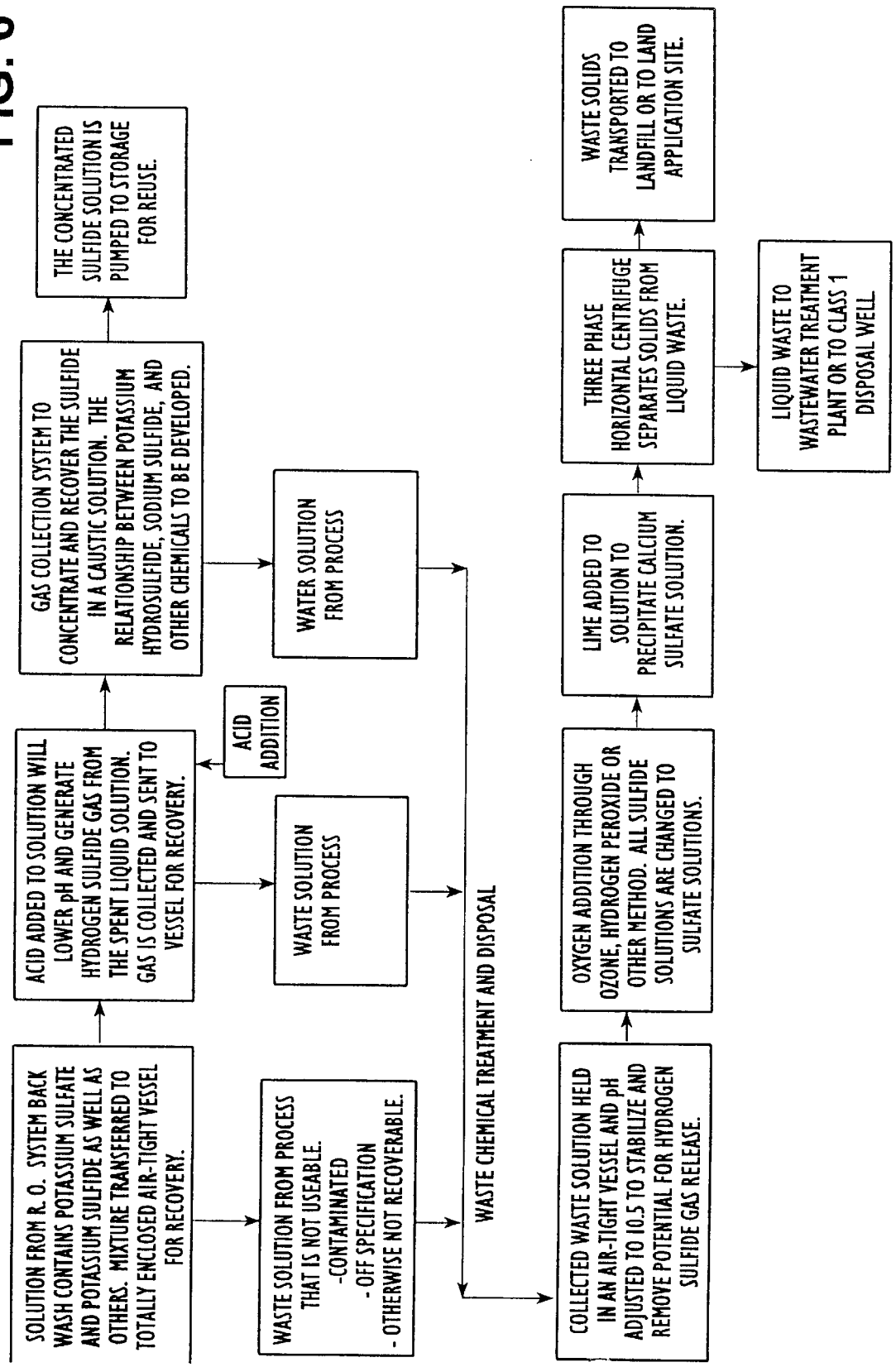
FIG. 6 is a flow chart which schematically illustrates a chemical recycle process according to the present invention.

The present invention reduces microbial contamination of meat and meat by-products by removing the hair of an animal before the disassembly of the animal during slaughtering, thereby substantially eliminating all foreign matter, including dirt, manure, blood, ingesta and most importantly, microorganisms, associated with animal hair. The present invention additionally provides a system for effectively recycling, reusing and disposing of chemical and animal products generated by the hair removal process which minimizes the cost and environmental impact of the dehairing method.

More particularly, the present invention provides a novel, comprehensive animal hair removal (dehairing) system which addresses various potential concerns with the animal hair removal process, including issues related to efficient and effective hair removal, sodium production in waste materials, production of $H_2S$ during the process, elimination or reduction of the use of certain chemicals in the process, removal of sulfides from animal hides, sulfide waste disposal, removal of solids from the waste materials, and reduction in water and reagent use and disposal.

In a meat processing facility, the opportunity for microbial contamination of meat and meat by-products first presents itself upon the cutting open of an animal, exposing the animal's interior to microorganisms present in the ambient environment. The risk of microbial contamination extends throughout the entire slaughtering process, including final fabrication of the animal into various sections of meat for commercial sale.

By practicing the present invention, the slaughtering process is initiated with animal carcasses essentially free of foreign matter and microorganisms, with minimal environmental impact. Using conventional procedures, animals enter the slaughtering process in a highly contaminated state and are processed in a manner that permits significant meat contamination to occur. In contrast, the depilatory hair removal method described herein drastically reduces the number of microorganisms from the onset of the slaughtering process, and increases the effectiveness of subsequent measures taken in the meat processing procedure to control the growth of spoilage and pathogenic microorganisms.

As used herein, the term microorganism refers to any microorganisms capable of contaminating meat products, thereby making such meat unsuitable or unhealthy for human or animal consumption.

As used herein, the term "animal" refers to any mammal of the kingdom Animalia which is consumed by humans or animals, including without limitation, bovine, ovine and porcine, and the term "hide" refers to the integument of an animal, such as a bovine hide, a porcine skin and an ovine pelt. The primary function of an animal hide while the animal is alive is to both form a protective barrier to actively prevent the penetration of material through the animal's hair. Microorganisms are unable to penetrate an intact living animal hide but can begin to enter the hide immediately upon the death of the animal. For four to eight minutes after an animal is immobilized, its skin continues acting as an active barrier to microorganisms.

Various embodiments of the method of the present invention are illustrated schematically in the flow charts and diagrams of FIGS. 1–10. The method is particularly described in detail below. Briefly, the dehairing method of the present invention can include the steps of: immobilizing an animal, presoaking the hide, applying the depilatory substance to the hide, removing the animal hair from the hide; applying a neutralization substance to the hide; applying a fresh water rinse to the hide; dispatching the animal; and various recycling and waste disposal steps that are integral with each of the above-mentioned dehairing steps. It is to be understood that some of these steps are optional, and that the particular order and inclusion of steps can be varied according to the needs and safety concerns of the user of the method.

The step of immobilizing an animal (e.g., stunning) is preferably performed prior to the application of a depilatory substance to the animal's hide. Immobilization includes any means for precluding movement of the animal. Such methods are described in detail, for example, in Bowling et al., U.S. Pat. No. 5,149,295, supra.

One embodiment of the invention further includes contacting a surfactant or wetting agent to the animal either prior to (e.g., a presoaking step) or in conjunction with a depilatory substance. Such a presoaking step facilitates the ability of the depilatory substance to go to the follicle at the surface of the hide, and also facilitates the removal of the depilatory substance from the hide later in the process. Penetration of the depilatory substance to the surface of the hide, and more preferably, below the surface of the hide and into the hair follicle can reduce the amount of dwell time for the depilatory substance on the hide, thereby improving throughput. Surfactants and wetting agents modify the nature of a surface and are known to break the surface tension of water, thus allowing for increased saturation of chemicals applied subsequent to or in conjunction with such surfactants and wetting agents. The surfactant or wetting agent of the present invention can be any composition known to those skilled in the art suitable for increasing penetration of depilatory substances on the hair of an animal. Preferably, the surfactant or wetting agent is chemically compatible with the depilatory substance to be used. For example, when used in the presoaking step of the present invention, a suitable surfactant or wetting agent facilitates the penetration of the subsequent depilatory substance close to the surface of the hide while minimizing chemical reactions with the depilatory substance that produce undesirable and/or toxic byproducts.

More particularly, surfactant or wetting agents include soaps, alcohols, fatty acids or detergents, preferably sodium salts of fatty acids, and most preferably sodium lauryl sulfate. In one embodiment of the present invention, the wetting agent used in a presoaking step can be liquid that has been recycled from the presoaking and/or depilatory application steps. Such recycled wetting agents can be applied with or without a surfactant.

The amount of surfactant used in a particular application depends on the strength of the depilatory substance used, the condition of an animal's hair, the temperature of the depilatory substance, and the amount of depilatory substance contact time, among other factors. Typically, the surfactant, when applied in connection with the depilatory substance, is applied in amounts by volume percent of depilatory substance of between about 3.0% and about 0.1%, more preferably between about 2% and about 0.3%, and most preferably between about 0.7% and about 0.4%. In a beef processing operation, for example, a single hide may be presoaked with about 50 gallons of wetting agent.

The step of contacting or applying the depilatory substance to an animal can involve any method which sufficiently contacts a depilatory substance with the hide of an animal to allow the depilatory substance to react with the animal's hair. Such methods may include, but are not limited to, immersing, spraying, showering or dousing of the animal, or any other means known in the art for applying similar substances to an animal or animal hide. Preferably, the step of contacting or applying the depilatory substance to an animal is any method which facilitates the penetration of the depilatory substance to the hair follicle at the surface of the animal's hide. In a further embodiment, the step of contacting or applying is any method which facilitates the recovery and collection of residual depilatory substance for reuse and/or recycling. Particularly preferred methods of contacting or applying include spraying and immersion. In one embodiment of the present invention, the prewetting solution used to prewet one hide is collected and reused (e.g., recycled) to prewet another hide.

In one embodiment of the present method, a depilatory substance is applied to an animal hide in two steps. The first step comprises spraying the depilatory substance onto a prewetted hide under low pressure, followed by a second application of the depilatory substance using a high pressure spray. Preferably, the spraying apparatus which delivers the depilatory substance is comprised of several moveable nozzles arranged around the hide in such a configuration that all surfaces of the hide are contacted with the spray, including areas which may be more difficult to contact, such as the area between the body and a leg of the animal. In this embodiment of the present invention, the substances used in the prewetting and low pressure application can be either fresh prewetting and depilatory substances, or more preferably, are recycled from previous prewetting and low pressure depilation of hides. Preferably, the depilatory substance used in the high pressure application is freshly made depilatory substance, although components recycled from various steps of the dehairing process can be used to make up the depilatory substance.

In the embodiment of the present invention wherein the hide is immersed in a depilatory substance, the animal is typically lowered into a bath of prewetting and/or depilatory substance. In this embodiment, it is preferable to provide a means of supporting the animal head above the baths such that the orifices of the animal's head (e.g., the eyes, nose, ears and mouth) do not contact the prewetting or depilatory substances. Such a supporting means can be any suitable device which functions to hold the animal head above the level of the bath during the immersion/dipping process. It is important to avoid internal contact of the animal with the chemicals used in the dehairing process to prevent contamination of the meat that is to be harvested from the animal later in processing.

In another embodiment, a depilatory substance is left to dwell on the animal hide until the hair is cleaved a small distance below the surface of the hide and the upper epidermis is removed. In an embodiment using sodium sulfide as the depilatory substance, the depilatory substance is sprayed onto the animal's hide for 1–60 seconds and left to dwell for an additional 1–180 seconds. In an embodiment using potassium sodium sulfide as the depilatory substance, the depilatory substance is sprayed onto the animal's hide for between about 5 to about 25 seconds and left to dwell for an additional time period of between about 20 to about 200 seconds.

As discussed above, the depilatory substance is preferably sprayed onto the animal's hide using a spray apparatus comprised of a plurality of moveable nozzles which are configured around the hide such that the entire surface area of the hide is contacted with the depilatory substance.

In a preferred embodiment of the present invention, the prewetting and depilatory application steps are designed to maximize the contact of the depilatory substance with the hair follicle at the surface of the hide, and more preferably, with the follicle below the surface of the hide. Such contact will allow the hair to be removed below the surface of the hide and is preferable to cleavage of the hair above or at the surface, which leaves "hair stubble" on the hide. Hair stubble is undesirable because such hides have increased risk of microbial contamination and have decreased value to tanners. In addition, a smooth hide facilitates the removal of the depilatory substance from the hide later in the process.

The depilatory substance of the present invention is any chemical compound known to depilate hair from an animal's hide. While not intending to be bound by theory, it is believed that depilatory substances remove hair by breaking chemical bonds within individual hair fibers. Animal hair, and specifically cattle hair, is composed primarily of a single structural protein, keratin. Individual keratin molecules are held together to form hair fibers by covalent disulfide bridges between cystine amino acid residues. These bonds are easily broken by reducing chemicals. Under strong reducing conditions, most of the disulfide bonds in a hair fiber will be broken and the hair will be cleaved into pieces less than a few millimeters in length. Other depilatory substances, such as strong caustic agents, act by oxidizing chemical bonds within hair fibers. An example of such caustic agents is a solution comprising sodium hydroxide, further described below. Therefore, according to this theory, the depilatory substances used in the present invention dissolve certain portions of an animal's hair and permit removal of the hair from the animal's hide. Moreover, upon contacting of a depilatory substance to an animal's hide, many microorganisms are initially killed by the strong reducing and oxidizing agents utilized.

It is within the scope of the present invention that the selection of the depilatory substance and the dwell time of the depilatory substance on the animal hide can be varied according to whether it is desired: (1) to remove the hair particle by breaking the hairs into small pieces and collecting the pieces for further use or processing, or alternatively, (2) to actually dissolve the hair, portions of the follicle, and other components on the surface of the hide to form a mush comprised of multiple compositions.

Preferably, the depilatory substance of the present invention can be sodium sulfide or potassium sodium sulfide; a composition of thioglycolic acid, sodium hydroxide and calcium oxide; sodium hydroxide and hydrogen peroxide; or potassium hydroxide and hydrogen peroxide. Care should be taken to use the various depilatory substances in amounts, concentrations and contact times which do not damage the animal hide. When the depilatory substance comprises sodium sulfide, sodium sulfide is in a concentration from about 5% to about 15%, more preferably from about 8% to about 13%, and most preferably from about 9% to about 12%. When the depilatory substance comprises potassium sodium sulfide, potassium sodium sulfide is in a concentration from about 5% to about 20%, more preferably from about 10% to about 15%, and most preferably from about 11% to about 14%.

In the embodiment of the invention in which the depilatory substance comprises sodium hydroxide and hydrogen peroxide, NaOH is present in a concentration of about 10% to about 20%, more preferably about 12% to about 17%, and most preferably about 13% to about 15%. In this embodiment, hydrogen peroxide is present in a concentration of about 1% to about 10%, more preferably about 2% to about 8% and most preferably about 4% to about 6%. In the embodiment of the invention in which the depilatory substance comprises potassium hydroxide and hydrogen peroxide, KOH is present in a concentration of about 10% to about 20%, more preferably about 12% to about 17%, and most preferably about 13% to about 15%. In this embodiment, hydrogen peroxide is present in a concentration of about 5% to about 15%, more preferably about 7% to about 13% and most preferably about 8% to about 12%.

In another embodiment of the invention, the depilatory substance comprises about 5% to about 15% thioglycolic acid, about 1% to about 5% calcium oxide and about 1% to about 5% sodium hydroxide. It is more preferable in the above embodiment to have thioglycolic acid in a concentration of about 7% to about 12%, and most preferably in a concentration of about 8% to about 11%.

In addition to the foregoing specific formulations, other chemicals recognized in the art as effective to remove or dissolve hair from the hide of an animal, can be used as well.

It has been recognized that certain depilatory substances work more effectively when heated, specifically, the above described depilatory substance comprising sodium hydroxide and hydrogen peroxide and those comprising thioglycolic acid, calcium oxide and sodium hydroxide. It is preferable to heat the respective depilatory substances to a temperature between about 90° F. and about 190° F., although to minimize deleterious effects on the animal hide, the depilatory substance is preferably heated to a temperature that is less than about 120° F., and more preferably, between about 90° F. and about 120° F. The dwell time of any particular depilatory substance contacted with an animal's hide will vary depending upon the particular animal species, the type and concentration of depilatory substances used and the temperature at which such depilatory substances are applied, as well as other factors. In a preferred embodiment using sodium sulfide, the depilatory substance is effective at about room temperature.

It is also desirable to maintain the pH of the depilatory substance relatively high (e.g., about 8 to about 13 pH, and more preferably, about 10 to about 13.5 pH), since a higher pH enhances the depilatory reaction and reduces the production of undesirable gases during the process. For example, when sodium sulfide is the depilatory substance, care must be taken to keep the pH level of the depilatory substance relatively high (about 9.5 to about 12) so as to avoid excessive production of hydrogen sulfide gas ($H_2S$) which is deadly poisonous. In one embodiment of the present invention, the pH of all of the substances used in the dehairing process is maintained throughout the process at a pH greater than about pH 10, and more preferably, greater than about pH 11. The present inventors have discovered that maintenance of a very high pH throughout the dehairing process greatly enhances the removal of hair from the animal hide and prevents the formation of $H_2S$ gas during the process. Moreover, due to the effectiveness of the recycling and waste disposal steps discussed below, the present method can be used, in some embodiments without the need for a neutralizing step.

The step of removing hair in the present invention can be accomplished in any manner which substantially eliminates the majority of hair on the animal. The dehairing of animals is performed relatively quickly to facilitate the timely conveyance of such animals along a meat processing line. In a preferred embodiment, hair is removed from an animal by directing pressurized water at the animal. The pressurized jets of water effectively strip the loosened hair from the animal's hide without damaging the hide. Other embodiments of the present invention include means for removal of hair using mechanical devices such as rigid blades, brushes or combs. Pressurized air sprays can also be effective in removing hair from the animal, especially in conjunction with the use of pressurized water sprays. The removal of the hair and microorganisms associated with such hair, achieves the objective of reducing microbial contamination of meat and meat by-products during the remainder of the slaughtering process.

In an alternative embodiment of the invention, a neutralizing substance can be applied to an animal subsequent to contacting a depilatory substance to the animal, and typically subsequent to the removal of the hair from the animal, although such a neutralizing step can be performed prior to the hair removal step. The neutralizing substance is provided to cease the particular chemical action of the depilatory substance. Use of a particular neutralizing substance depends upon the depilatory substance being used. For example, in one embodiment of the present invention, the depilatory substance sodium sulfide is neutralized by application of sodium bicarbonate or sodium carbonate in combination with hydrogen or sodium peroxide. In this embodiment, about 5% to about 15% sodium sulfide is applied to the animal's hide and left to dwell for about 1 to about 180 seconds before removal of the animal's hair. After removal of the hair, a solution containing about 5% to about 15% sodium bicarbonate and about 1% to about 5% peroxide is sprayed onto the animal's hide and left to dwell on the hide for about 1 to about 60 seconds to allow for the oxidation of sulfide ions. Additional peroxide applications may be used for complete oxidation of any remaining sulfides. Such additional applications of peroxide may be followed by additional carbonate and sodium bicarbonate washings to further adjust pH levels.

In another embodiment of the present invention using a combination of sodium hydroxide and peroxide as the depilatory substance, an oxidating agent such as an organic acid, for example, acetic acid, propionic acid, lactic acid or citric acid, is used to cease the depilatory action of the depilatory substance. When a composition of thioglycolic acid, sodium hydroxide and calcium oxide is used as the depilatory substance, hydrogen peroxide is used as the neutralizing substance. The amount of neutralizing substance used in a particular case depends upon the amount and type of depilatory substance used, the time constraints on the dehairing process, as well as other factors.

As discussed above, the neutralizing step of the present invention is optional. It is an advantage of the present invention that the recycling and waste disposal steps described below are sufficient to reduce problems associated with production of toxic $H_2S$ gas and the removal and handling of sulfides from the hides, so that additional neutralization steps may not be necessary. In addition, elimination of such a neutralization step further reduces waste disposal issues associated with the neutralization liquors.

In a further embodiment, the method of dehairing an animal of the present invention can include a fresh water rinse which is performed after the removal of the hair and/or the neutralizing step and prior to the dispatching of the animal.

The additional step of dispatching of an animal is preferably performed subsequent to the step of removing hair from an animal. The term "dispatch" as used herein refers to the killing of the animal and is typically accomplished by exsanguination of the animal through the severing of the animal's carotid artery while the animal is immobilized and suspended from a conveyor line.

Having described the initial steps in the method of the present invention for dehairing an animal, the description now turns to the second and integral portion of the method, a novel system for collecting, recycling, reusing, and/or disposing of the various compositions and byproducts of the above described process. As discussed above, this embodiment of the method of the present invention offers many advantages and improvements to the dehairing system, since such a method increases the cost effectiveness and reduces the negative environmental impact of the above-described dehairing process. While the second portion of the method is described as it would be used with the depilatory substances particularly described herein, the method can be easily adapted for use with other depilatory substances. It is to be understood that eliminating or varying particular steps of the present method according to the needs and facilities of the individual user is intended to be encompassed within the scope of the present invention.

In the recycling/disposal embodiment of the method of the present invention, the sludge by-product produced by the dehairing process is collected along with the presoaking substances, depilatory substances, surfactants, neutralizing substances, and various foreign matter found in the hair. These substances are sent through various recycling and cleansing/disposal processes as described below. Hair recovered and separated from the sludge can be further processed for use as animal feed and for composing of fertilizer precursors, as well as other uses including recovery of specific amino acids.

In the total method for dehairing an animal of the present invention, after each step, a waste stream is produced. It is within the scope of the present invention that each of these waste streams can be individually collected and treated, collected and treated in small groups, or collected and treated as a single waste solution. In one embodiment, it may be preferable to collect each of the waste streams individually to maximize the recycling and reuse of various components. Such collection may be accomplished, for instance, by collecting a waste stream from each step through a drain on the floor of the area where each step is performed (or from individual basins if immersion is used), and routing the waste streams individually to various treatment areas. For example, it may be desirable to separate the waste stream of the prewetting step and/or low pressure depilatory application step from the high pressure depilatory application step or immersion depilatory application step in order to facilitate the separation of manure/mud waste (from the prewetting/low pressure steps) from the hair waste (from the high pressure/immersion step). In addition, as will be apparent from the discussion below, the present invention includes a novel process for recycling various chemicals used in the depilatory process, and efficiency of such recycling steps may be increased by disposing of different waste products separately. Moreover, as will be discussed below, it may be desirable to recycle some waste products after only minimal treatment, while other waste streams will require more complex waste treatment before recycling is possible.

In another embodiment, the waste streams can be collected and treated together, such as through a plurality of floor drains or basin drains which feed into a common recycling/treatment facility.

One embodiment of the system for recycling and waste disposal is schematically illustrated in the flow diagrams of FIGS. 1–6. Particular embodiments of such a system are described in detail below.

In one embodiment of the present invention, the liquors from the presoaking, depilatory application, hair removal, neutralizing, and/or fresh water rinse steps, which contain the various applied substances, hair, manure and other solids, are collected (separately, in small groups or as a single waste stream) and initially sent (separately, in small groups or as a single waste stream) through a system and/or systems for separating liquids from solids. Such a system can be any system for achieving such separation and can include centrifuges and/or screening devices. Additionally, the waste stream collected from the neutralizing rinse and/or the fresh water rinse (i.e., after removal of the animal hair) can be recycled back to the neutralizing substance makeup system for reuse.

In the embodiment illustrated in FIGS. 1–5, large particle solids are separated from the liquor by use of a Parkson Traveling Belt Screen and a series of vibrating screens of increasing mesh size. For example, the waste material can be passed from the Parkson Traveling Belt Screen, which is a continuously moving belt or plate filter screen, to a screen having a pore size opening of between about 0.1 to about 0.4 inches. One embodiment of the screen separation step is specifically illustrated in FIG. 7. In this figure, the used mother liquor is poured onto the top of a screen of about 3–6 mesh which is mounted at a 45–60° slope. The screen can be, for example, a wire screen which is framed in wood, having a hydrophobic manmade woven or knit cloth mounted on the screen. The solids stay on top of the screen, rolling down into a collection trough, while the screened liquor is collected in a drain pan for transport to the next separation/purification step. A 40 micron screen, and then a 10 micron screen can be used to further separate solid components.

The solids collected from the screening separation processes can be sent to a solids separation system to separate the animal hair from other solids, such as mud and manure. Separated mud and manure can be recovered and used in a fertilizer product, or alternatively, the mud and manure can be used in a land application or sent to a landfill for disposal. Hair separated at this stage can be sent to a hair protein recovery process, where the recovered proteins (i.e., amino acids) are marketed for use in other applications.

At this stage, some of the liquor from the initial solids separation stage can be recycled back to be reused in the presoaking and/or initial depilatory application steps, if desired. The remainder of this liquor passes from the screening processes through an optional centrifuge system, which will remove finer impurities from the liquor. For example, in one embodiment, the liquor moves from the screening system into horizontal centrifuges, and then to vertical centrifuges. The waste collected from the centrifuge system can then be sent back to the solids separation system as discussed above and/or directly to a land application or landfill.

In the next step of the recycling/disposal process, the liquor passes from the centrifuge system to a bag filter system. Alternatively, it may be desirable and sufficient to eliminate the centrifuge system step altogether and move directly from the screening system to the bag filter system. The bag filter system is comprised of a series of bag filters having decreasing pore size through which the liquor passes. For example, the liquor can move from the centrifuge system to a series of 10 micron bag filters, and then to a series of 2 micron bag filters. In this step, solid waste filtrate from the bag filters can be sent to the solids separation system as discussed above, and/or directly to a land application or landfill.

In the next step of the recycling process, the filtered liquor moves from the bag filter system to a reverse osmosis system. In this system, external pressure is applied to the filtered liquor to oppose the natural process of osmosis, forcing the water in the liquor out of the liquor, which is high in salts. In one embodiment of the present invention, the reverse osmosis system is a two phase system. A reverse osmosis system will typically recycle about 70% of the liquor flow as recycled water and will waste about 30% of the liquor flow. Preferably, the recycled water produced by this system contains less than about 20 ppm of dissolved solids. The recycled water can be adjusted to a neutral pH (i.e., about 7), if necessary, and recycled to the depilatory substance or neutralizing substance makeup systems (i.e., the systems wherein these substances are diluted and mixed prior to their application to the hides). In a preferred embodiment of the present method, the recycled water is not neutralized to pH 7, since production of a depilatory substance having a high pH is preferable, and since elimination of the neutralization substance can be accomplished due to the recycling steps set forth herein.

Figure 8:
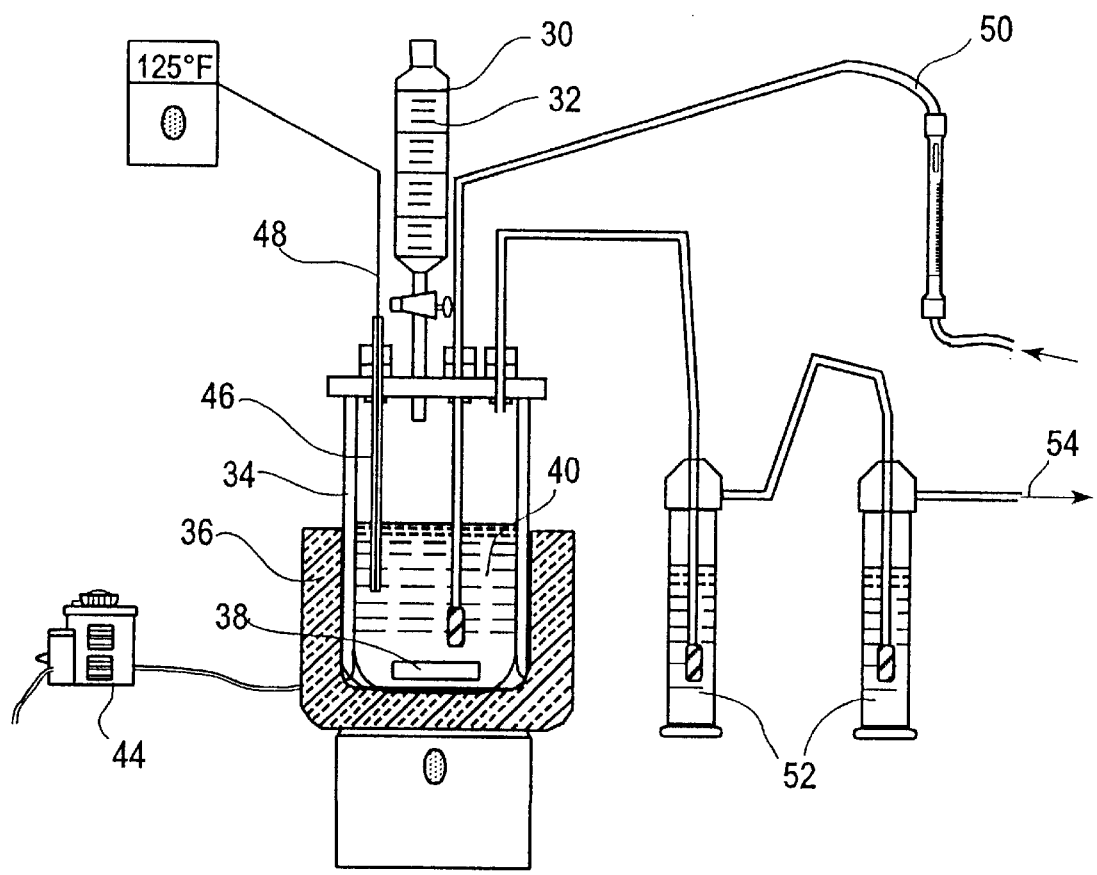
FIG. 8 is a schematic illustration of an apparatus for acid treatment of submitted, spent dehairing liquor for recovery of residual sulfide value via $H_2S$ absorption in a caustic soda scrubber.
Figure 9:
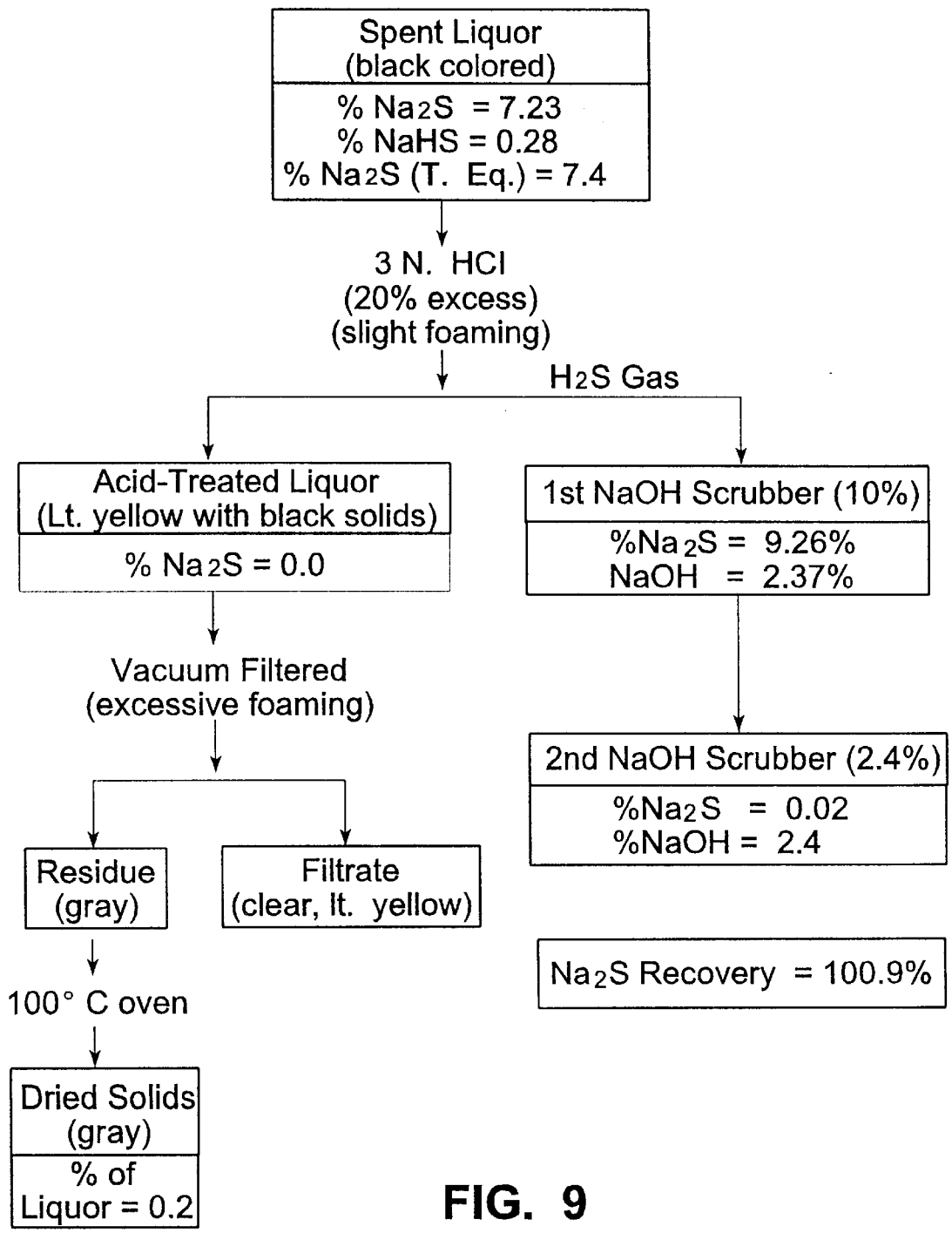
FIG. 9 is a flow chart which schematically illustrates a process for laboratory treatment of submitted spent dehairing liquor for recovery of residual sulfide value via $H_2S$ absorption in a caustic soda scrubber.
Figure 10:
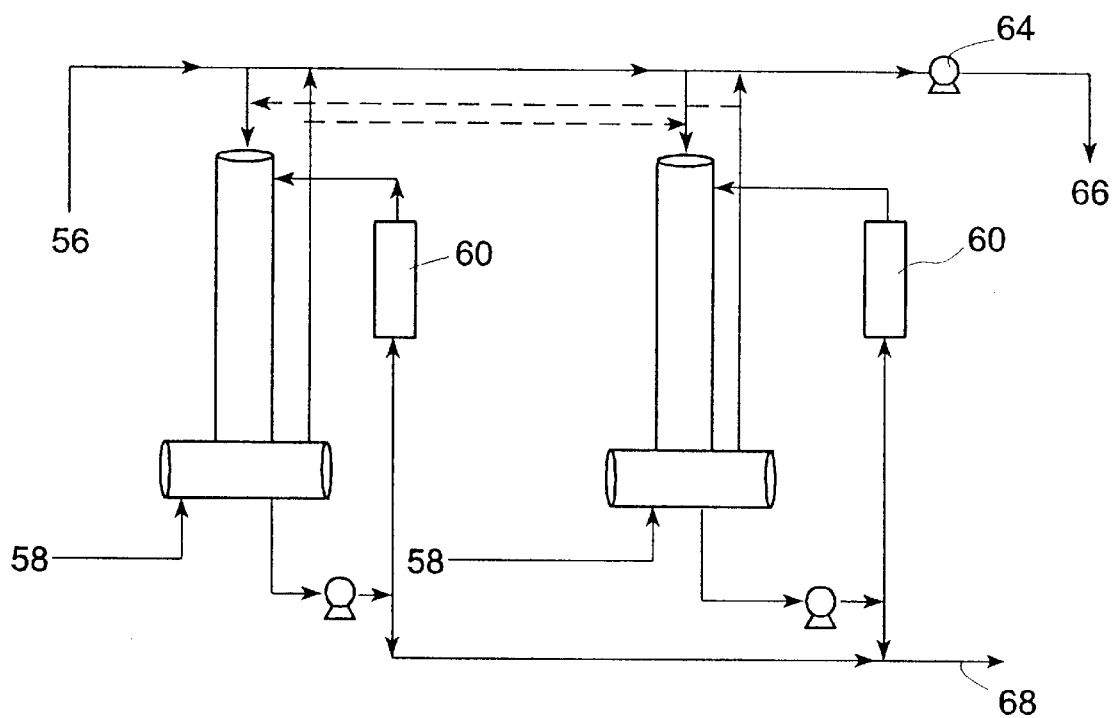
FIG. 10 is a flow chart which schematically illustrates a caustic soda scrubber for $H_2S$ recovery as NaHS.

The waste from the reverse osmosis process will contain a high concentration of chemicals and byproducts from the hair removal process. The next steps of the method of the present invention are designed to dispose of this waste in a safe and efficient manner. First, the waste from the reverse osmosis process moves to a salvaged chemical recycling process. This process will salvage chemicals such as sulfides from the waste, allowing the sulfides to be recycled back to the depilatory makeup system. Briefly, in the salvaged chemical recycling process wherein the chemicals include sulfides and sulfates, the waste, or spent liquor is transferred to a totally enclosed, air-tight vessel. An acid, such as HCl, can then be added to the spent liquor, which, under lower pH conditions, can generate $H_2S$ gas. The $H_2S$ gas can be collected and scrubbed by passage through a caustic soda scrubber, an embodiment of which is illustrated in FIGS. 8, 9 and 10. More particularly, the $H_2S$ gas generated by the reaction of sulfides and acid is collected in a contained system which heats, concentrates and releases the sulfide into a sodium hydroxide or potassium hydroxide solution. The concentrated sulfide solution can then be pumped into a storage system for reuse, for example, in the depilatory makeup process. The air in the system can then be safely released into the atmosphere.

At this stage, the remainder of the waste liquor can be sent to a waste chemical treatment and disposal process. In this process, the collected waste solution from the above-described chemical salvage process is held in an air-tight vessel and the pH is adjusted, if necessary, to about 10.5 to stabilize the liquor and reduce the potential for hydrogen sulfide gas release. As discussed above, it is a preferred embodiment to maintain the pH at greater than pH 10 throughout the process, thereby eliminating the need to adjust the pH at various recovery steps. Oxygen is then added to the solution by the addition of ozone, hydrogen peroxide, or any other suitable oxygenation method. In addition, lime is added to the liquor. The addition of oxygen to the liquor changes the residual sulfides in the liquor into sulfates, and the addition of lime precipitates the sulfates out of the liquor in the form of calcium sulfate. The precipitated solids can then be removed from the solution by any suitable method, such as by centrifugation. Preferably, the calcium sulfate solids are removed by three phase horizontal centrifugation. The calcium sulfate solids can then be transported to a land application and/or landfill sites. The final remaining liquid waste solution can now be safely transported to a wastewater treatment facility for discharge, or to a Class I disposal well.

Still another aspect of the present invention relates to the use of potassium-based compounds to supplant the amount of sodium-based compounds used in the dehairing process. In such a manner, the problems associated with the recovery and recycling of sodium is decreased, if not eliminated. For example, the use of potassium hydroxide and sodium hydroxide in a mixture, preferably about 50% of each, more preferably at least about 40% sodium hydroxide, has been found to reduce the amount of sodium recovery/recycling problems.

As will be appreciated, another aspect of the present invention is directed to the system itself for facilitating the above-described method. Such a system includes, for example: a system for removing hair from an animal, wherein said animal is immobilized, dispatched and fabricated, said system comprising the steps of:

a. a means for contacting a prewetting substance comprising a surfactant to an animal's hair;

b. a means for contacting a depilatory substance to the animal's hair; and c. a means for removing the hair contacted by the depilatory substance;

d. a means for collecting a waste stream comprising a prewetting substance, a depilatory substance and removed hair; and, e. a means for processing said waste streams by a system comprising:

1. a means for separating solid waste from liquid waste;

2. a means for treating the solid waste to separate hair from other solids;

3. a means for recovering protein from the removed hair; and, 4. a means for treating the liquid waste to produce a result selected from the group consisting of: removal and recycling of sulfides, removal of fine solid waste from the liquid; recovering and recycling water from the liquid waste; eliminating $H_2S$ gas from the liquid waste; and disposal of residual sulfides in the liquid waste as sulfates.

Figure 7A:
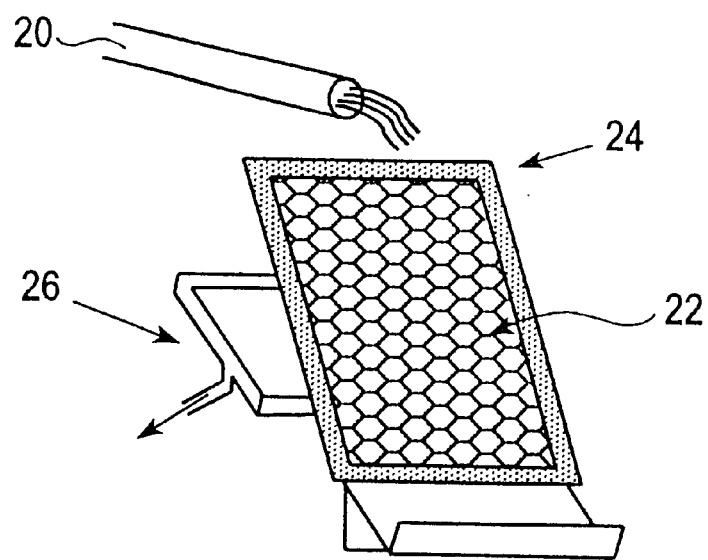
FIGS. 7A and 7B are schematic illustrations of a screen separation step according to the present invention.
Figure 7B:
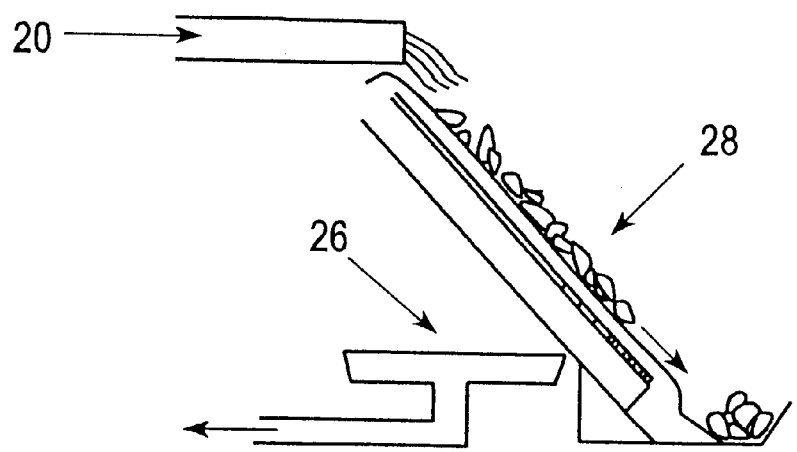

In one embodiment, used liquor 20 is provided to a wire screen 22, such wire screen 22 preferably bounded by a frame, such as a wooden frame 24. Such wire screen's dimensions are preferably at least about 2 square yards in an area and is preferably mounted at a 45°–60° sloped angle. The wire screen 22 preferably has a mesh of between 3 and 6 with a hydrophobic man-made woven or knit cloth having openings of at least about, 0.04 inches. Positioned beneath the wire screen 22 is a drain pan 26 for the screened mother liquor. Shown in FIGS. 7A and 7B are views of the above-described screening process.

With respect to FIG. 8, an apparatus for acid treatment of spent dehairing liquor is provided so that residual sulfide can be recovered and $H_2S$ absorbed in a caustic soda scrubber. As illustrated, a dropping funnel containing HCl 32 is connected to a resin flash 34 which is contained within a heating mantle 36. A stirrer bar 38 is used to agitate the spent liquor 40 by means of a magnetic stirrer 42. The mantle 36 is connected to a variac 44. A thermal well 46 is connected to a thermal couple 48, such thermal well 46 immersed in. the spent liquor 40. A nitrogen purge 50 is connected to and in contact with the spent liquor 40 within the resin flask 34. The top of the resin flask 34 is connected to at least one caustic soda scrubber 52 which are ultimately vented to the atmosphere 54.

FIG. 9 illustrates an acid treatment of submitted spent, dehairing liquor for recovery of residual sulfide values via $H_2S$ absorption in a caustic soda scrubber.

With reference to FIG. 10, $H_2S$ from acidified spent dehairing liquor is transported so that it comes into contact with 25% NaOH 58 and is pumped through a heater 60 by a typical pump means or a blower 64, ultimately conveying material to a thermal oxidizer 66 or to an NaHS storage tank 68.

In summary, the method for dehairing animals as disclosed herein is a comprehensive, efficient and cost effective method for removing hair from animal hides, while recycling and/or safely disposing of compositions and waste products produced during the process.

While various embodiments of the present invention have been described in detail, it is apparent that modifications and adaptations of those embodiments will occur to those skilled in the art. However, it is to be expressly understood that such modifications and adaptations are within the scope of the present invention.

What is claimed:

1. A method for processing waste products generated in an animal dehairing operation comprising the steps of:
    a) collecting a first waste stream after a chemical depilatory substance has been contacted with an animal's hair;
    b) collecting a second waste stream containing a greater content of animal hair components than said first waste stream;
    c) separately processing said first waste stream to recover at least a portion of said depilatory substance;
    d) separately processing said second waste stream by separating animal hair components from said second waste stream; and
    e) monitoring whether $H_2S$ gas is generated during said method.

2. The method as set forth in claim 1, further comprising reducing the amount of $H_2S$ gas from said first and second waste streams.

3. The method as set forth in claim 2, wherein at least one of said first and second waste streams contain substantially no water.

4. The method as set forth in claim 1, further comprising directing said second waste stream through a separation device selected from the group consisting of a centrifuge, a vibrating screen and a screen having hydrophobic material associated therewith.

5. The method of claim 1, further comprising directing at least one of said first and second waste streams through a separation device.

6. A system for processing waste products generated in an animal dehairing operation comprising:
    a) a means for collecting a first waste stream after a chemical depilatory substance has been contacted with an animal's hair;
    b) a means for collecting a second waste stream containing a greater content of animal hair components than said first waste stream;
    c) a means for separately processing said first waste stream to recover at least a portion of said depilatory substance;
    d) a means for separately processing said second waste stream by separating animal hair components from said second waste stream; and
    e) a means for monitoring whether $H_2S$ gas is generated during said dehairing operation.

7. The system of claim 4, further comprising a means for reducing the amount of $H_2S$ gas from said second waste stream.

8. A system for processing waste products generated in an animal dehairing operation comprising:
    a) a means for collecting a first waste stream after a chemical depilatory substance has been contacted with an animal's hair;
    b) a means for collecting a second waste stream containing a greater content of animal hair components than said first waste stream;
    c) a means for separately processing said first waste stream to recover at least a portion of said depilatory substance;
    d) a means for separately processing said second waste stream by separating animal hair components from said second waste stream; and
    e) a means for recycling at least one of said first and second waste streams to reuse components thereof in said dehairing operation.

9. The system as set forth in claim 8, further comprising a means for reducing the amount of $H_2S$ gas that may be present in said second waste stream.

* * * * *